US012462972B2

(12) United States Patent
Chan

(10) Patent No.: US 12,462,972 B2
(45) Date of Patent: Nov. 4, 2025

(54) TRANSFORMER

(71) Applicant: DELTA ELECTRONICS, INC., Taoyuan (TW)

(72) Inventor: Po-Kai Chan, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 1033 days.

(21) Appl. No.: 17/382,381

(22) Filed: Jul. 22, 2021

(65) Prior Publication Data

US 2022/0223335 A1 Jul. 14, 2022

(30) Foreign Application Priority Data

Jan. 11, 2021 (CN) ......................... 202110028651.1

(51) Int. Cl.

*H01F 27/34* (2006.01)
*H01F 17/04* (2006.01)
*H01F 27/24* (2006.01)
*H01F 27/28* (2006.01)

(52) U.S. Cl.

CPC ........... *H01F 27/346* (2013.01); *H01F 17/04* (2013.01); *H01F 27/24* (2013.01); *H01F 27/28* (2013.01)

(58) Field of Classification Search

CPC .......... H01F 17/04; H01F 27/24; H01F 27/28; H01F 27/346; H01F 3/14; H01F 3/10; H01F 27/38
USPC ......................... 336/212, 214, 215, 220–222
See application file for complete search history.

(56) References Cited

U.S. PATENT DOCUMENTS 4,771,257 A * 9/1988 Gunnels .................. H01F 38/10 336/212
7,528,694 B2 5/2009 Tseng et al.
2004/0239470 A1* 12/2004 Lu ........................ H03H 1/0007 336/212
2016/0247627 A1* 8/2016 Baker ................. H01F 27/2823
2019/0378643 A1* 12/2019 Zhou ................... H01F 27/2823

FOREIGN PATENT DOCUMENTS

CN 201207322 Y 3/2009
CN 201417660 Y 3/2010
CN 102163489 A * 8/2011
CN 102208241 A 10/2011
CN 103077803 A * 5/2013
CN 203721415 U 7/2014
CN 104183369 A 12/2014
CN 106936320 A 7/2017
CN 207183040 U 4/2018
(Continued)

*Primary Examiner* — Tszfung J Chan
(74) *Attorney, Agent, or Firm* — CKC & Partners Co., LLC

(57) ABSTRACT

The present disclosure is related to a transformer. The transformer includes a core group, a first coil and a second coil. The core group includes two external portions and a middle portion. The middle portion is located between the two external portions. The middle portion has an upper section, a middle section and a lower section. Each of the upper section and the lower section has a first gap between one of the two external portions. The middle section has a second gap between one of the two external portions. The first gap is different from the second gap. The first coil surrounds the lower section of the middle portion. The second coil surrounds the upper section of the middle portion.

18 Claims, 9 Drawing Sheets

(56) References Cited

FOREIGN PATENT DOCUMENTS

| | | | | | |
|---|---|---|---|---|---|
| CN | 108492965 | A | * | 9/2018 | ............. H01F 17/00 |
| EP | 2827484 | A1 | * | 1/2015 | ............. H01F 27/24 |
| TW | M471016 | U | | 1/2014 | |
| WO | 2018051390 | A1 | | 3/2018 | |

* cited by examiner

TRANSFORMER

RELATED APPLICATION

This application claims priority to China Application Serial Number 202110028651.1, filed Jan. 11, 2021, which is herein incorporated by reference in its entirety.

BACKGROUND

Field of Invention

The present disclosure relates to a transformer.

Description of Related Art

In general, there are two types of transformers with a primary inductance and a leakage inductance. The first type of the transformer is the combination of primary transformer with a resonant inductance to generate and adjust the leakage inductance by the resonant inductance. However, this type of transformer requires two components, which are the primary transformer and the resonant inductance, so the space for the first type of the transformer needs to be large, which is disadvantageous for miniaturization. The second type of the transformers is a split-tank transformer. The split-tank transformer has two coils to generate a primary induction magnetic path and a leakage induction magnetic path. The coils are separated by air, and a leakage inductance value is controlled by a number of turns of the coils, so no additional components are required. A space for the second type of the transformers is small, but the number of turns of the coils must be defined during the manufacturing process, so the leakage inductance value cannot be further adjusted after the manufacturing process is completed, which results in low commonality.

SUMMARY

An aspect of the present disclosure is related to a transformer.

According to an embodiment of the present disclosure, the transformer includes a core group, a first coil and a second coil. The core group includes two external portions and a middle portion. The middle portion is located between the two external portions. The middle portion has an upper section, a middle section and a lower section. Each of the upper section and the lower section has a first gap between one of the two external portions. The middle section has a second gap between one of the two external portions. The first gap is different from the second gap. The second coil surrounds the upper section of the middle portion.

In an embodiment of the present disclosure, each of the upper section and the lower section of the middle portion has a protruding portion extending in a first direction, and the first direction faces toward the external portion.

In an embodiment of the present disclosure, the middle section of the middle portion has a protruding portion extending in the first direction.

In an embodiment of the present disclosure, a width of the middle section of the middle portion is the same as a width of the upper section and a width of the lower section in a first direction, and the first direction faces toward the external portion.

In an embodiment of the present disclosure, the upper section of the middle portion has a protruding portion extending in a third direction, the third direction is vertical to a first direction, the first direction faces toward the external portion, and a width of the protruding portion in the first direction is the same as a width of the middle section and a width of the lower section in the first direction.

In an embodiment of the present disclosure, the second gap is bigger than the first gap.

In an embodiment of the present disclosure, the second gap is an air gap.

In an embodiment of the present disclosure, the transformer further comprises a positionally adhesive layer. The positionally adhesive layer is located in the first gap and contacts one of the upper section and the lower section and one of the two external portions.

In an embodiment of the present disclosure, a portion of the first coil and a portion of the second coil are accommodated in the two external portions of the core group.

In an embodiment of the present disclosure, a number of the first coil is different from a number of the second coil.

In an embodiment of the present disclosure, the number of the first coil is more than the number of the second coil.

In an embodiment of the present disclosure, a distance between a top surface of the upper section and the middle section is different from a distance between a bottom surface of the lower section and the middle section.

In an embodiment of the present disclosure, the distance between the top surface of the upper section and the middle section is smaller than the distance between the bottom surface of the lower section and the middle section.

In an embodiment of the present disclosure, a width of the upper section, a width of the middle section and a width of the lower section are smaller than a distance between two opposite edges of the first coil in a first direction, and the first direction faces toward the external portion.

In an embodiment of the present disclosure, a width of the upper section, a width of the middle section and a width of the lower section are smaller than a distance between two opposite edges of the second coil in a first direction, and the first direction faces toward the external portion.

In an embodiment of the present disclosure, a thickness of the middle section of the middle portion is smaller than a thickness of the upper section and a thickness of the lower section in a second direction, the second direction is vertical to a first direction, and the first direction faces toward the external portion.

In an embodiment of the present disclosure, each of the two external portions has a first side pillar, a middle pillar, a second side pillar and a body, and the first side pillar, the middle pillar, and the second side pillar extend outward from the body.

In an embodiment of the present disclosure, the first gap is different from the second gap.

In the embodiments of the present disclosure, due to the first coil of the transformer surrounds on the lower section of the middle portion and the second coil surrounds on the upper section of the middle portion, a primary inductance and a leakage inductance may be generated. In addition, a primary induction magnetic path passes through the first gap between the middle portion and the external portions of the core group, and a leakage induction magnetic path passes through the second gap between the middle portion and the external portions of the core group. In this way, a primary inductance value may be adjusted by adjusting a size of the first gap, and a leakage inductance value may be adjusted by adjusting a size of the second gap, such that the transformer with high commonality and small space is achieved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
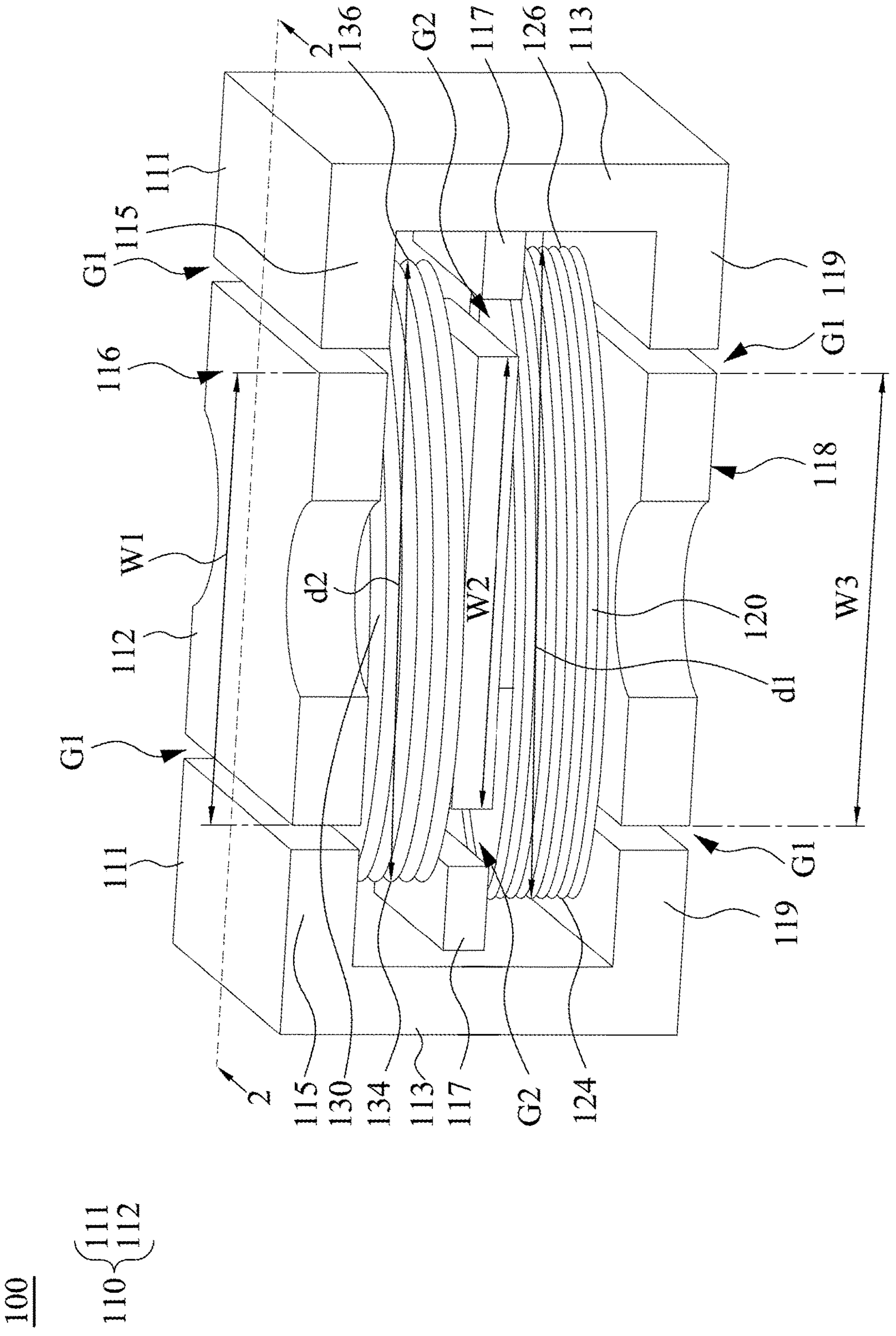
FIG. 1 illustrates a stereoscopic view of a transformer according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
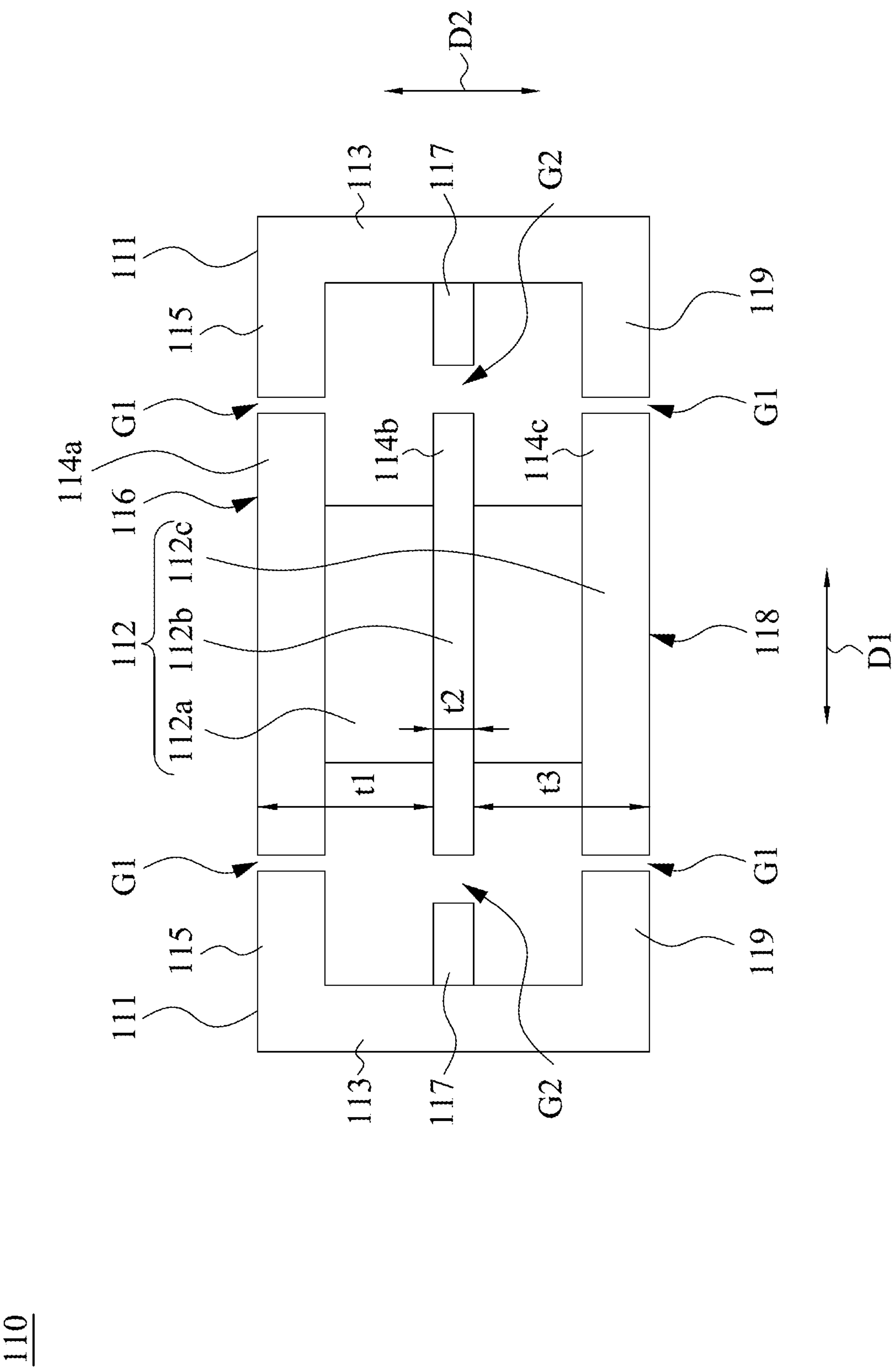
FIG. 2 illustrates a cross-sectional view along section 2-2 of the transformer in FIG. 1, in which the first coil and the second coil are omitted.

FIG. 1 illustrates a stereoscopic view of a transformer 100 according to one embodiment of the present disclosure. FIG. 2 illustrates a cross-sectional view along section 2-2 of the transformer 100 in the FIG. 1, in which the first coil 120 and the second coil 130 are omitted. Referring to the FIG. 1 and the FIG. 2 together, in this embodiment, the transformer 100 includes a core group 110, a first coil 120 and a second coil 130. The core group 110 includes two external portions 111 and a middle portion 112. The middle portion 112 of the core group 110 is located between the two external portions 111 of the core group 110. The middle portion 112 of the core group 110 has an upper section 112*a*, a middle section 112*b* and a lower section 112*c*. In this disclosure, the upper section 112*a* of the middle portion 112 means a part above the middle section 112*b*, and the lower section 112*c* of the middle portion 112 means a part below the middle section 112*b*. As shown in FIG. 2, in a second direction D2, a thickness t1 of the upper section 112*a* of the middle portion 112 and a thickness t3 of the lower section 112*c* of the middle portion 112 are bigger than a thickness t2 of the middle section 112*b*, and the upper section 112*a* includes a surrounding area where the second coil 130 surrounds, and the lower section 112*c* includes a surrounding area where the first coil 120 surrounds.

Two sides of the upper section 112*a* of the middle portion 112 have a first gap G1 between two external portions 111, respectively, and two sides of the lower section 112*c* of the middle portion 112 also have a first gap G1 between two external portions 111, respectively. In addition, two sides of the middle section 112*b* of the middle portion 112 have a second gap G2 between two external portions 111, respectively. In other words, there are four first gaps G1 and two second gaps G2 between the middle portion 112 and the two external portions 111. The first gap G1 is different from the second gap G2. For example, the first gap G1 is smaller than the second gap G2. The first coil 120 surrounds the lower section 112*c* of the middle portion 112 of the core group 110, and the second coil 130 surrounds the upper section 112*a* of the middle portion 112 of the core group 110, so that a primary inductance and a leakage inductance may be generated during power-on operation. The first gap G1 is located on a magnetic path of the primary inductance (will be described in detail in FIG. 3), and the second gap G2 is located on a magnetic path of the leakage inductance, and the primary inductance magnetic path is different from the leakage inductance magnetic path.

For example, when the first gap G1 is bigger, a primary inductance value is lower. Similarly, when the second gap G2 is bigger, a leakage inductance value is lower. In some embodiments, the middle portion 112 and the two external portions 111 of the core group 110 may be made up of a material that includes iron cores, but it is not limited in this regard. In addition, the coil thickness of the second coil 130 is larger than the coil thickness of the first coil 120. The number of turns of the first coil 120 is different from the number of turns of the second coil 130. For example, the number of turns of the first coil 120 is more than the number of the turn of the second coil 130. In some embodiments, a portion (such as an external portion) of the first coil 120 and a portion (such as an external portion) of the second coil 130 are accommodated in the two external portions 111 of the core group 110.

Figure 3:
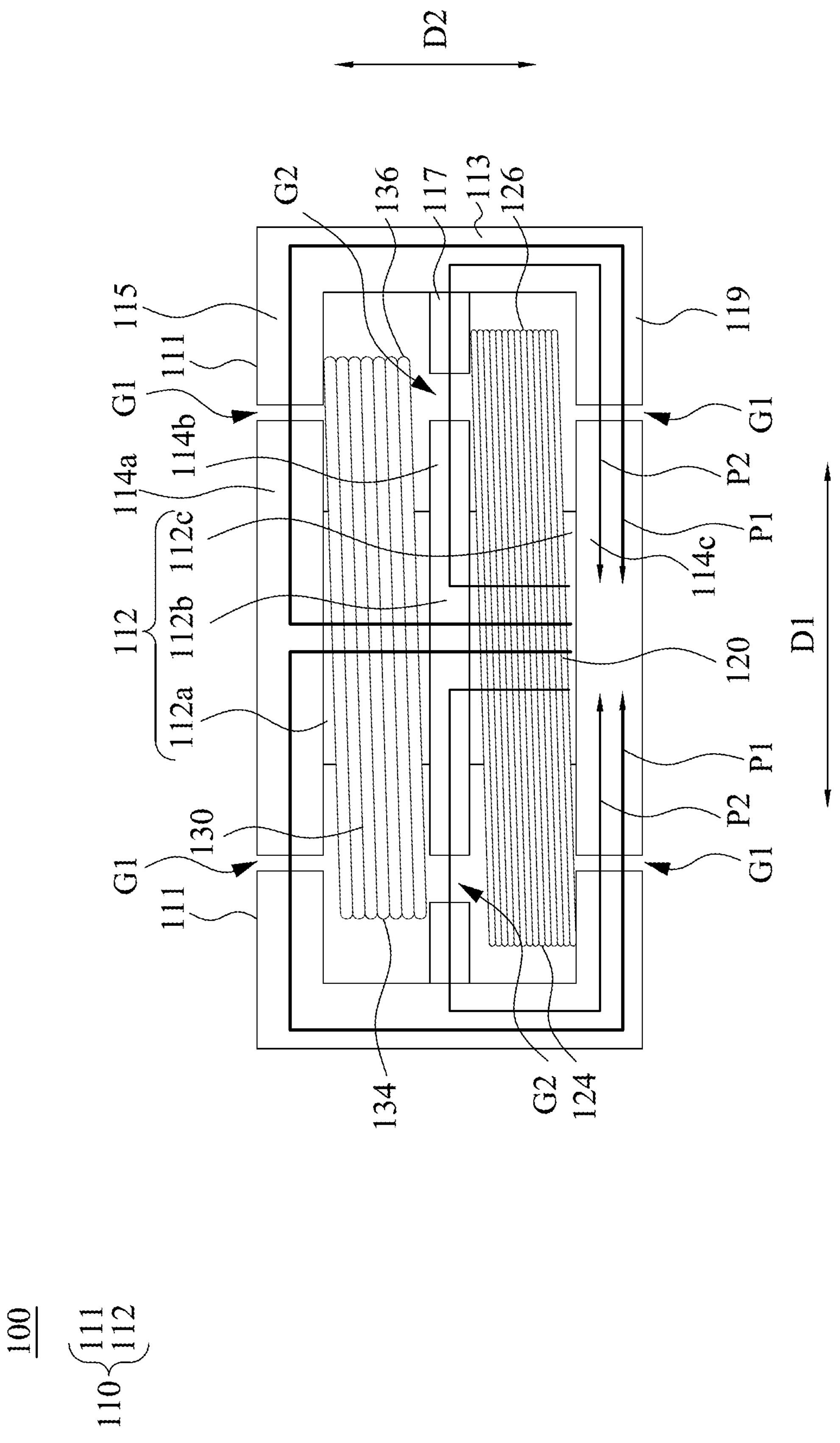
FIG. 3 illustrates a cross-sectional view of the transformer in FIG. 1 while the transformer is operated.

The FIG. 3 illustrates a cross-sectional view of the transformer 100 in the FIG. 1 while the transformer 100 is operated. Referring to the FIG. 2 and the FIG. 3 together, the first coil 120 of the transformer 100 surrounds the lower section 112*c* of the middle portion 112 of the core group 110, and the second coil 130 surrounds the upper section 112*a* of the middle portion 112 of the core group 110, so the primary inductance and the leakage inductance may be generated. Also, the primary inductance magnetic path P1 passes through the first gaps G1 between the middle portion 112 and the two external portions 111 of the core group 110, and the leakage inductance magnetic path P2 passes through the second gap G2 between the middle portion 112 and the two external portions 111 of the core group 110. Therefore, the primary inductance value may be adjusted by the first gap G1, and the leakage inductance value may be adjusted by the second gap G2. In this embodiment, the first gap G1 and the second gap G2 may be air gaps. A middle pillar 117 of the external portions 111 may be performed by a grinding process during manufacturing, such that the second gap G2 may be bigger than the first gap G1 after the core group 110 is assembled.

In this way, the primary inductance value may be adjusted by adjusting a size of the first gap G1, and the leakage inductance value may be adjusted by adjusting a size of the second gap G2, such that the transformer 100 with high commonality and small space is achieved.

In some embodiments, the upper section 112*a* of the middle portion 112 of the core group 110, the middle section 112*b* of the middle portion 112 of the core group 110 and the lower section 112*c* of the middle portion 112 of the core group 110 each have a protruding portion 114*a*, 114*b*, and 114*c* extending in a first direction D1, the first direction D1 faces toward the external portion 111, and the first direction D1 and a second direction D2 are vertical to each other. That is, the protruding portion 114*a* of the upper section 112*a* of the middle portion 112, the protruding section 114*b* of the middle section 112*b* of the middle portion 112 and the protruding section 114*c* of the lower section 112*c* of the middle portion 112 may form the middle portion 112 into a shape shown in the FIG. 2. The middle portion 112 and the two external portions 111 shown in the FIG. 2 has four first gaps G1 and two second gaps G2 therebetween.

In this embodiment, the two external portions 111 each have a first side pillar 115, a middle pillar 117, a second side pillar 119 and a body 113. The first side pillar 115, the middle pillar 117 and the second side pillar 119 extend from the body 113. The middle pillar 117 of the external portion 111 is located between the first side pillar 115 and the second side pillar 119 of the external portion 111. There is a first gap G1 between the protruding portion 114*a* of the upper section 112*a* of the middle portion 112 and the first side pillar 115 of the external portion 111. There is a first gap G1 between the protruding portion 114*c* of the lower section 112*c* of the middle portion 112 and the second side pillar 119 of the external portion 111. There is a second gap G2 between the protruding portion 114*b* of the middle section 112*b* of the middle portion 112 and the middle pillar 117 of the external portion 111.

For example, a length of the middle pillar 117 of the external portion 111 extending from the body 113 is smaller than a length of the first side pillar 115 of the external portion 111 extending from the body 113 and smaller than a length of the second side pillar 119 of the external portion 111 extending from the body 113, so the second gap G2 is different from the first gap G1. In details, the second gap G2 is bigger than the first gap G1.

In addition, a width W1 of the protruding portion 114*a* of the upper section 112*a* of the middle portion 112, a width W2 of the protruding portion 114*b* of the middle section 112*b* and a width W3 of the protruding portion 114*c* of the lower section 112*c* are smaller than a distance d1 between two opposite edges 124 and 126 of the first coil 120. Moreover, the width W1 of the protruding portion 114*a* of the upper section 112*a*, the width W2 of the protruding portion 114*b* of the middle section 112*b* and the width W3 of the protruding portion 114*c* of the lower section 112*c* are smaller than a distance d2 between two opposite edges 134 and 136 of the second coil 130. In other words, the two opposite edges 124 and 126 of the first coil 120 and the two opposite edges 134 and 136 of the second coil 130 extend into the two external portions 111.

It is to be noted that the connection relationship of the aforementioned elements will not be repeated. In the following description, other types of core groups will be described.

Figure 4:
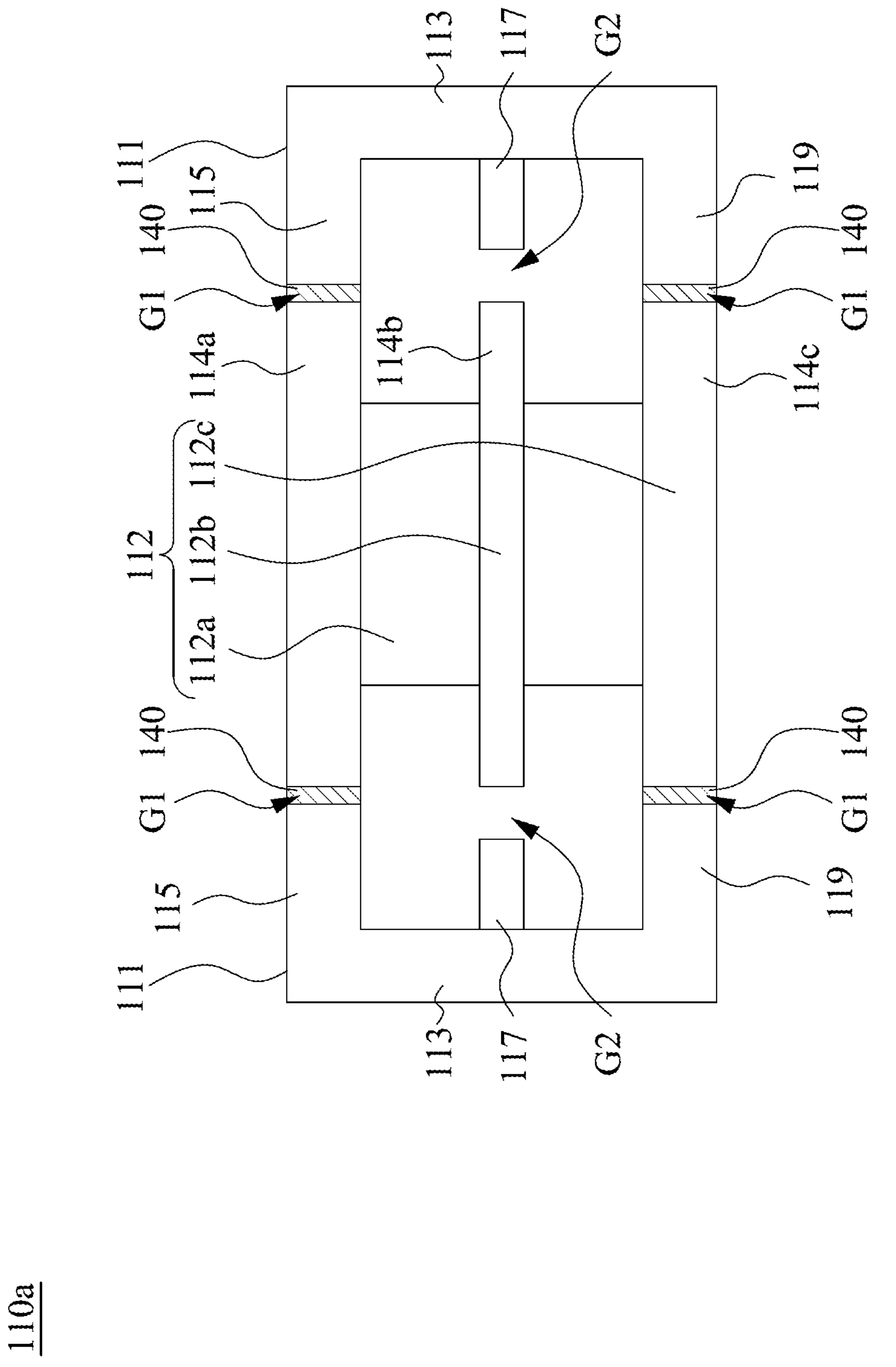
FIG. 4 illustrates a cross-sectional view of a core group according to another embodiment of the present disclosure, in which a cross-sectional position in the FIG. 4 is the same as it in the FIG. 2.

FIG. 4 illustrates a cross-sectional view of a core group 110*a* according to another embodiment of the present disclosure, in which a cross-sectional position in the FIG. 4 is the same as it in the FIG. 2. The difference from the embodiment in the FIG. 2 is that a transformer 100*a* further includes a positionally adhesive layer 140 filled in the first gap G1. The positionally adhesive layer 140 has a positioning effect. The positionally adhesive layer 140 may be located in the first gap G1 between the middle portion 112 and the two external portions 111. The positionally adhesive layer 140 may contact the protruding portion 114*a* of the upper section 112*a* of the middle portion 112 and the first side pillar 115 of the external portion 111. The positionally adhesive layer 140 may also contact the protruding portion 114*c* of the lower section 112*c* of the middle portion 112 and the second side pillar 119 of the external portion 111. For example, the positionally adhesive layer 140 may be a tape, an adhesive or a glass bead tape, but it is not limited in this regard. The positionally adhesive layer 140 may provide the viscosity necessary to position the positional relationship between the middle portion 112 and the two external portions 111. In addition, the glass bead tape has glass beads with different sizes, so the glass beads with different sizes may be selected to adjust the size of the first gap G1 and to provide viscosity between the middle portion 112 and the two external portions 111 to produce positioning effect.

Figure 5:
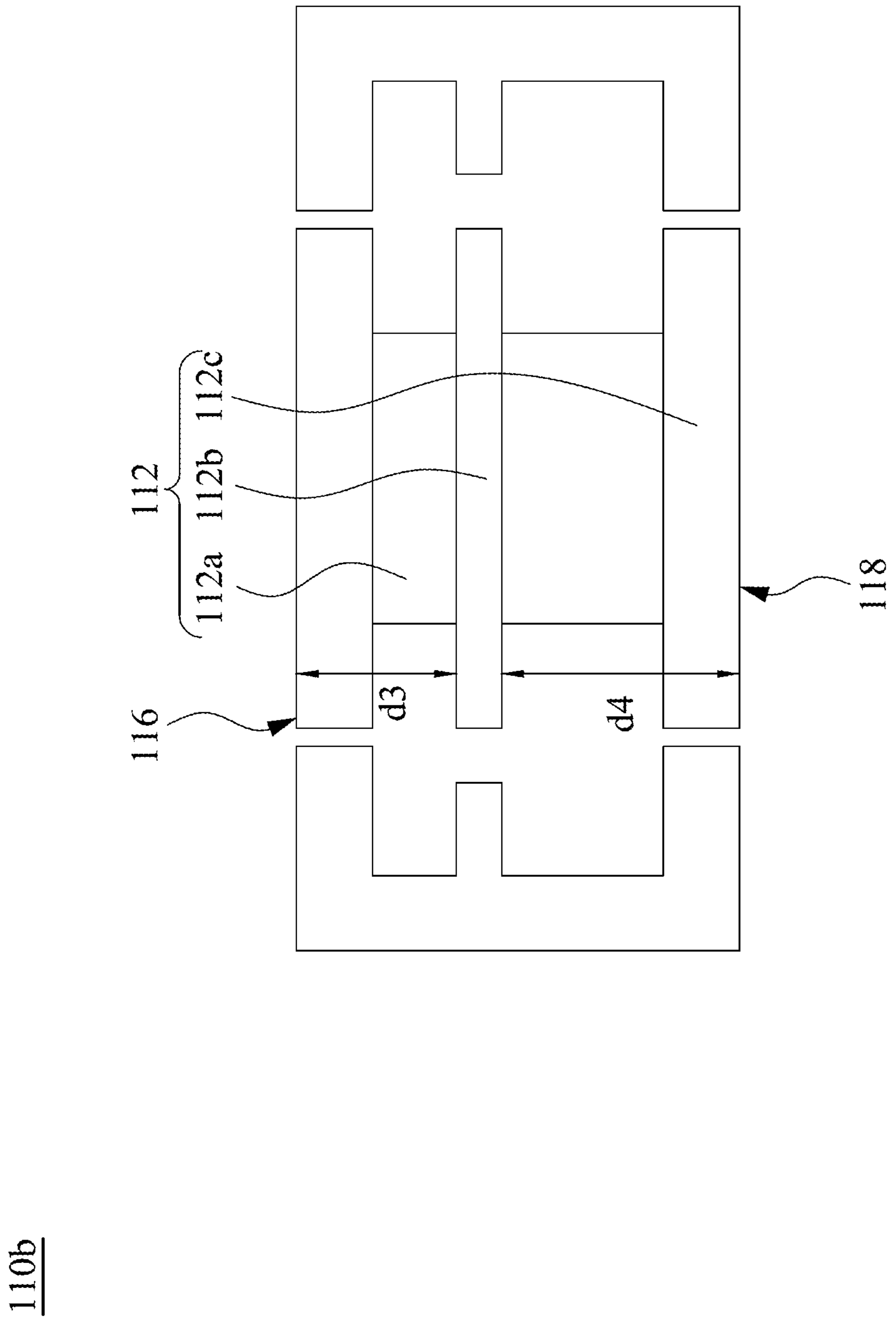
FIG. 5 illustrates a cross-sectional view of a core group according to another embodiment of the present disclosure, in which a cross-sectional position in the FIG. 5 is the same as it in the FIG. 2.

FIG. 5 illustrates a cross-sectional view of a core group 110*b* according to another embodiment of the present disclosure, in which a cross-sectional position in the FIG. 5 is the same as it in the FIG. 2. The difference from the embodiment in the FIG. 2 is that a distance d3 between a top surface 116 of the middle portion 112 of the core group 110*b* and the middle section 112*b* of the middle portion 112 is different from a distance d4 between a bottom surface 118 of the middle portion 112 of the core group 110*b* and the middle section 112*b* of the middle portion 112. For example, the distance d3 is smaller than the distance d4.

Figure 6:
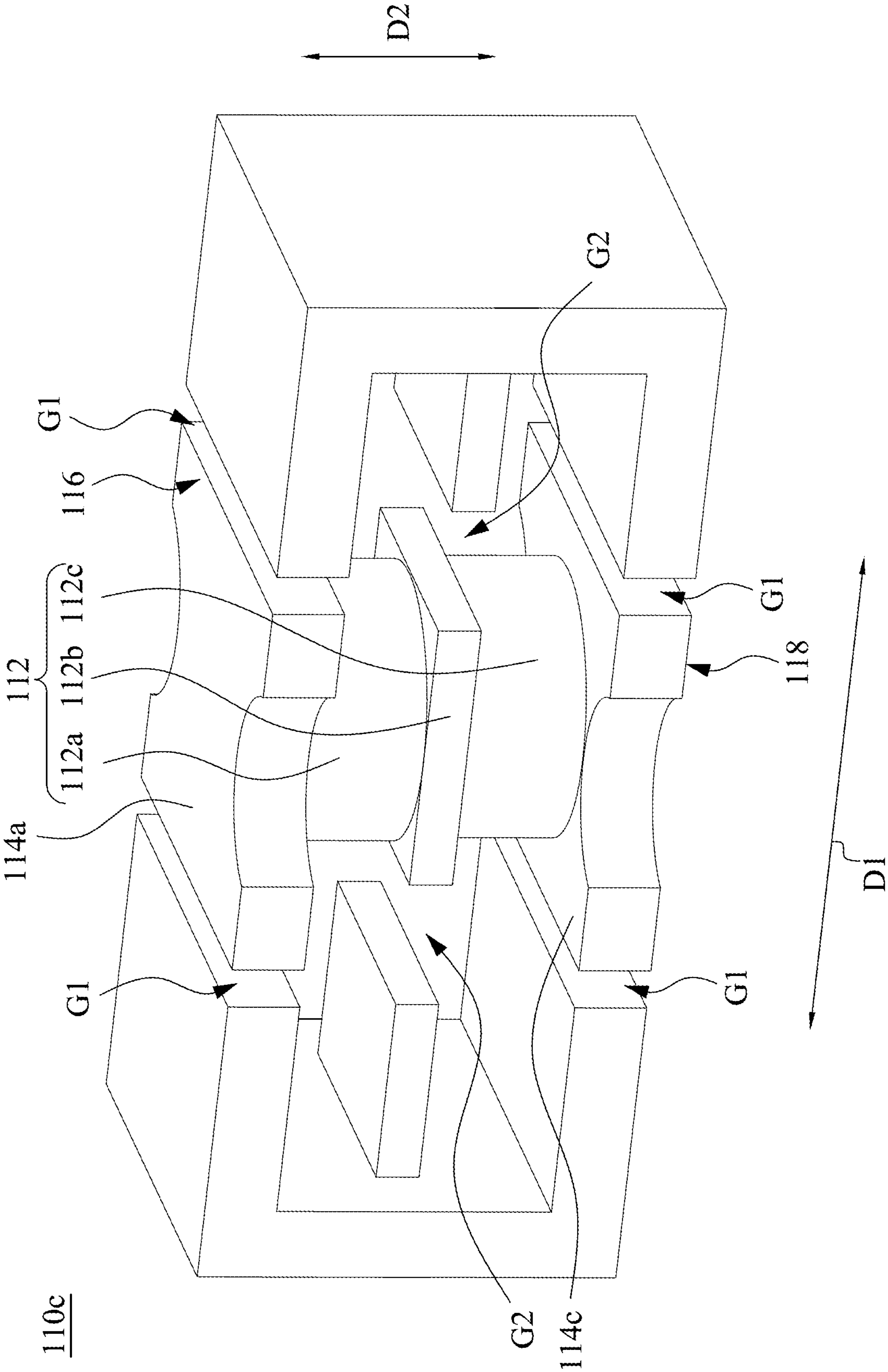
FIG. 6 illustrates a stereoscopic view of a core group according to yet another embodiment of the present disclosure.

FIG. 6 illustrates a stereoscopic view of a core group 110*c* according to yet another embodiment of the present disclosure. The difference from the embodiment in the FIG. 2 is that the upper section 112*a* and the lower section 112*c* of the middle section 112 of the core group 110*c* each have a protruding section 114*a* and 114*c* extending in the first direction D1, but the middle section 112*b* does not have the protruding portion 114*b* shown in the FIG. 2. That is, the protruding portion 114*a* of the upper section 112*a* of the middle portion 112 and the protruding portion 114*c* of the lower section 112*c* of the middle portion 112 form the middle portion 112 into a shape shown in the FIG. 6. The middle portion 112 and the two external portions 111 shown in the FIG. 6 has four first gaps G1 and two second gaps G2 therebetween. Also, the second gap G2 is bigger than the first gap G1.

Figure 7:
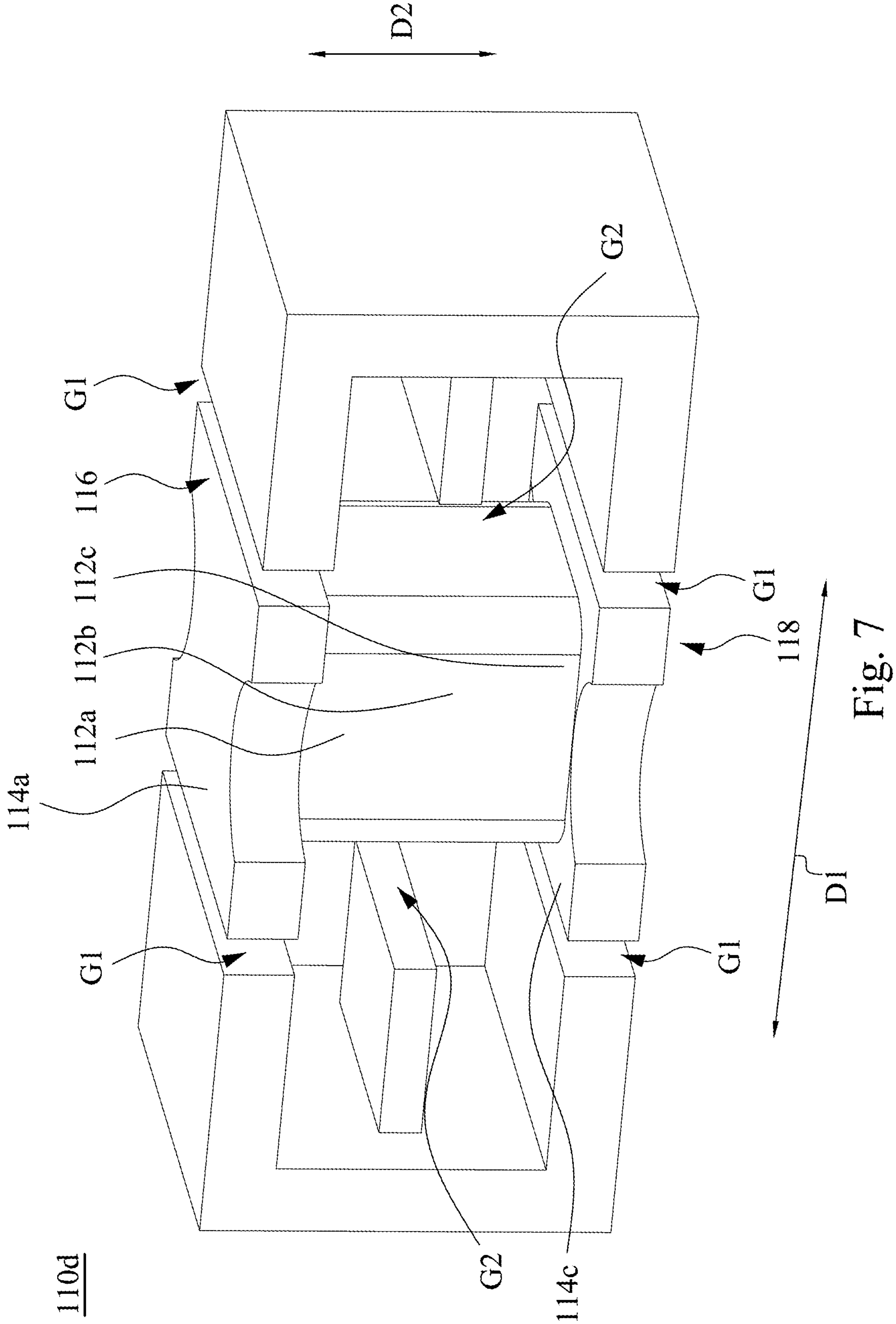
FIG. 7 illustrates a stereoscopic view of a core group according to yet another embodiment of the present disclosure.

FIG. 7 illustrates a stereoscopic view of a core group 110*d* according to yet another embodiment of the present disclosure. The difference from the embodiment in the FIG. 2 is that the upper section 112*a* of the middle portion 112 of the core group 110*d* and the lower section 112*c* of the middle portion 112 each have a protruding portion 114*a* and 114*c* extending in the first direction D1, but the middle section 112*b* does not have the protruding portion 114*b* shown in the FIG. 2. The middle portion 112 of the core group 110*d* and the two external portions 111 has four first gaps G1 and two second gaps G2 therebetween. Also, the second gap G2 is bigger than the first gap G1.

Figure 8:
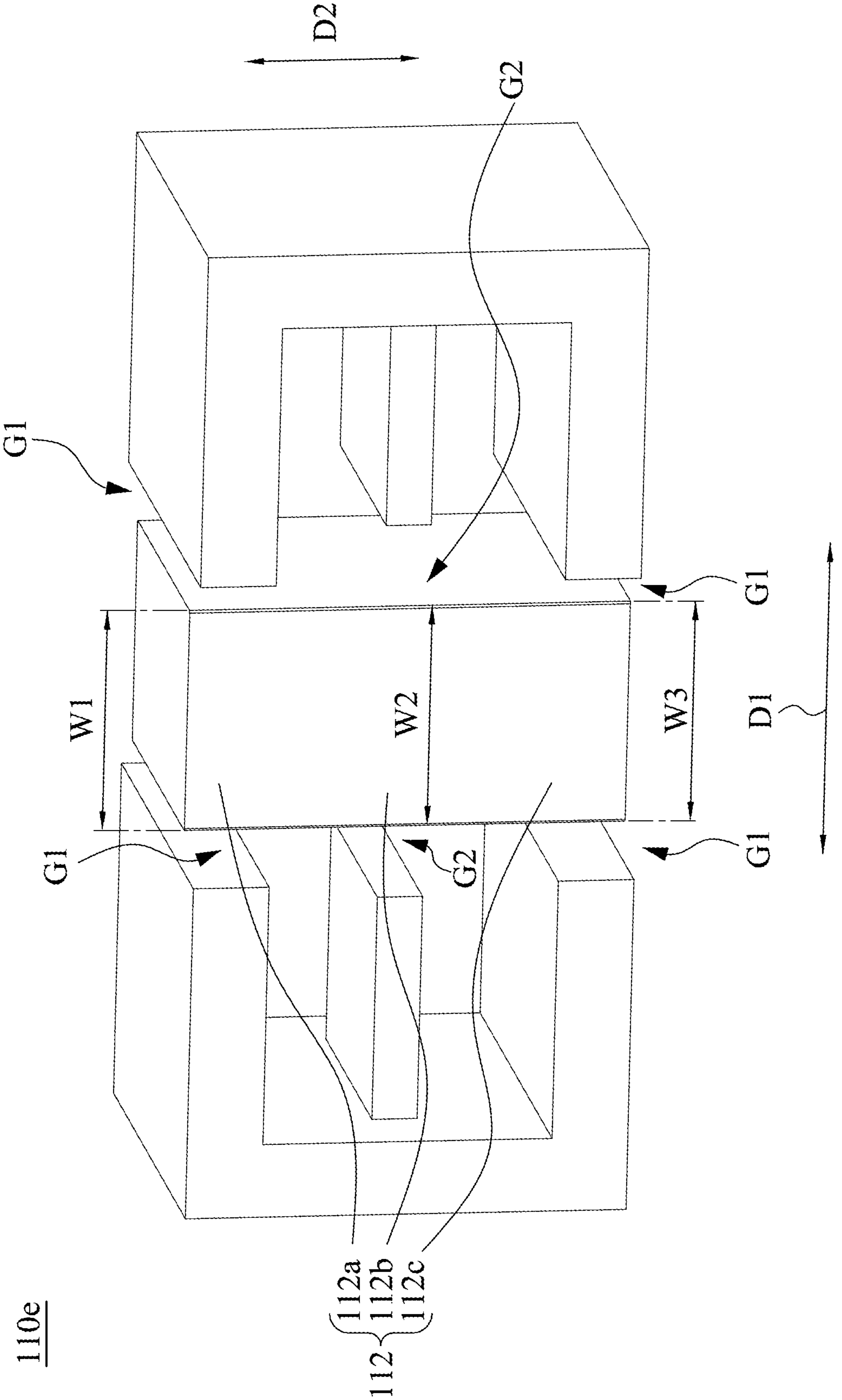
FIG. 8 illustrates a stereoscopic view of a core group according to yet another embodiment of the present disclosure.

FIG. 8 illustrates a stereoscopic view of a core group 110*e* according to yet another embodiment of the present disclosure. The difference from the embodiment shown in the FIG. 2 is that the middle portion 112 of the core group 110*e* does not have the protruding portions 114*a*, 114*b*, and 114*c* shown in the FIG. 2. In other words, the width W2 of the middle section 112*b* of the middle portion 112 of the core group 110*e* is the same as the width W1 of the upper section 112*a* and the width W3 of the lower section 112*c*. That is, the upper section 112*a*, the middle section 112*b*, and the lower section 112*c* with the same width may form the middle portion 112 into a cuboid. The cuboid middle portion 112 and the two external portions 111 has four first gaps G1 and two second gaps G2 therebetween. Also, the second gap G2 is bigger than the first gap G1.

Figure 9:
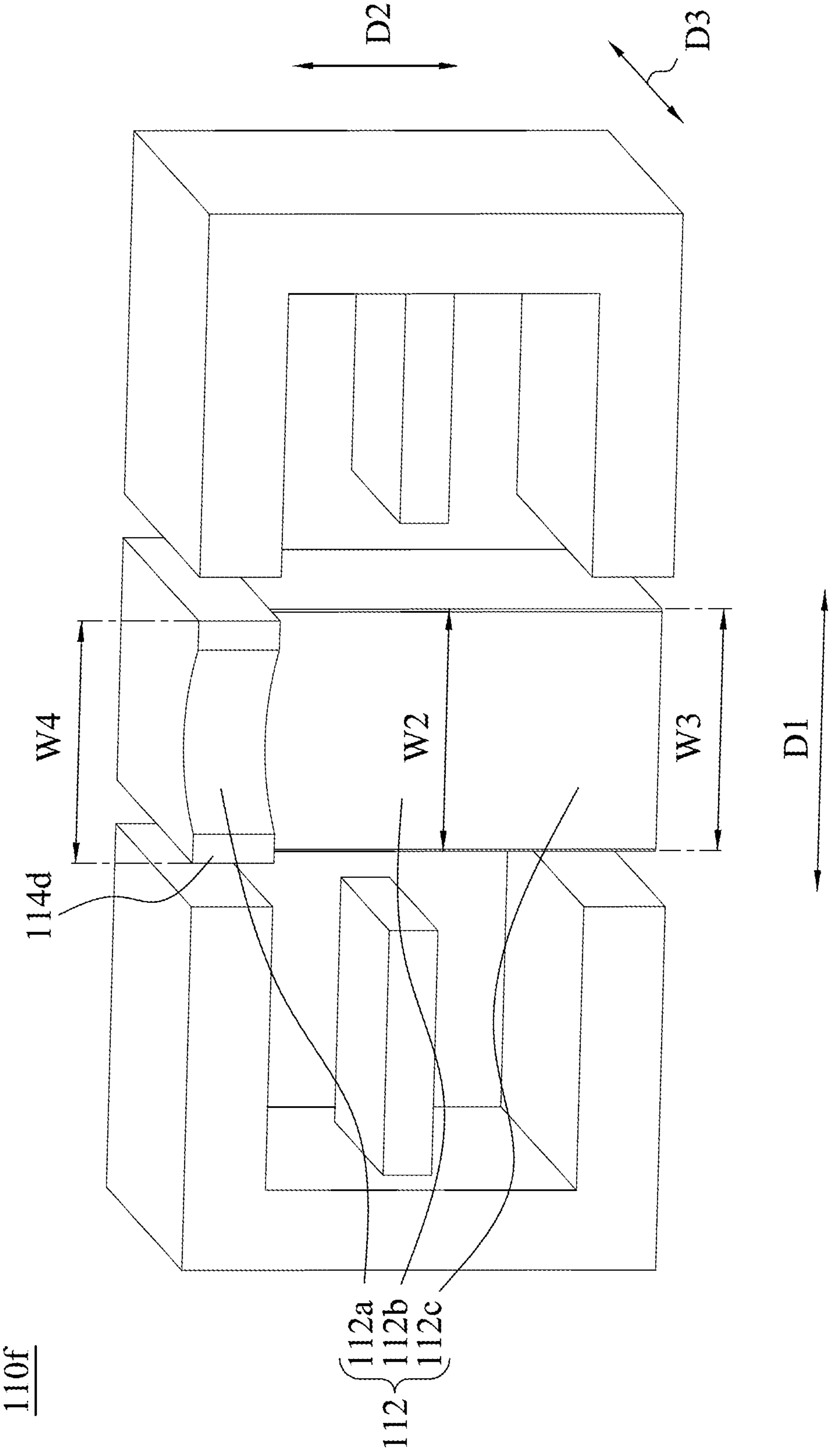
FIG. 9 illustrates a stereoscopic view of a core group according to yet another embodiment of the present disclosure.

FIG. 9 illustrates a stereoscopic view of a core group 110*f* according to yet another embodiment of the present disclosure. The difference from the embodiment in the FIG. 2 is that the upper section 112*a* of the middle portion 112 of the core group 110*f* has a protruding portion 114*d* extending in a third direction D3, the third direction D3, the first direction D1 and the second direction D2 are vertical to each other, and a width W4 of the protruding portion 114*d* of the upper section 112*a* in the first direction D1 is the same as the width W2 of the middle section 112*b* in the first direction D1 and the width W3 of the lower section 112*c* in the first direction D1. The middle portion 112 of the core group 110*f* and the two external portions 111 has four first gaps G1 and two second gaps G2 therebetween. Also, the second gap G2 is bigger than the first gap G1.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A transformer, comprising:

a core group comprising two external portions and a middle portion, wherein the middle portion is located between the two external portions, the middle portion has an upper section, a middle section and a lower section, between one of the two external portions and each of the upper section and the lower section has a first gap, and between one of the two external portions and the middle section has a second gap, each of the two external portions has a first side pillar, a second side pillar, a middle pillar between the first side pillar and the second side pillar, and a body vertically connecting the first side pillar, the middle pillar, and the second side pillar, and a length of the middle pillar is shorter than a length of the first side pillar and a length of the second side pillar;

a first coil surrounding the lower section of the middle portion; and a second coil surrounding the upper section of the middle portion, wherein a primary inductance and a leakage inductance are generated during power-on operation because the first coil surrounds the lower section of the middle portion and the second coil surrounds the upper section of the middle portion, a primary inductance magnetic path passes through the first gaps of the upper section and the lower section, and a leakage inductance magnetic path passes through the second gap, such that a primary inductance value is adjusted by adjusting sizes of the first gaps of the upper section and the lower section, and a leakage inductance value is adjusted by adjusting a size of the second gap, the first gaps and the second gap are aligned in a vertical direction, and a width of the second gap is greater than a width of the first gap.

2. The transformer of claim 1, wherein each of the upper section and the lower section of the middle portion has a protruding portion extending in a first direction, and the first direction faces toward the external portion.

3. The transformer of claim 2, wherein the middle section of the middle portion has a protruding portion extending in the first direction.

4. The transformer of claim 1, wherein a width of the middle section of the middle portion is the same as a width of the upper section and a width of the lower section in a first direction, and the first direction faces toward the external portion.

5. The transformer of claim 1, wherein the upper section of the middle portion has a protruding portion extending in a third direction, the third direction is vertical to a first direction, the first direction faces toward the external portion, and a width of the protruding portion in the first direction is the same as a width of the middle section and a width of the lower section in the first direction.

6. The transformer of claim 1, wherein the second gap is bigger than the first gap.

7. The transformer of claim 1, wherein the second gap is an air gap.

8. The transformer of claim 1, further comprising:

a positionally adhesive layer located in the first gap and contacting one of the upper section and the lower section and one of the two external portions.

9. The transformer of claim 1, wherein a portion of the first coil and a portion of the second coil are accommodated in the two external portions of the core group.

10. The transformer of claim 1, wherein a number of the first coil is different from a number of the second coil.

11. The transformer of claim 10, wherein the number of turns of the first coil is more than the number of turns of the second coil.

12. The transformer of claim 1, wherein a distance between a top surface of the upper section and the middle section is different from a distance between a bottom surface of the lower section and the middle section.

13. The transformer of claim 12, wherein the distance between the top surface of the upper section and the middle section is smaller than the distance between the bottom surface of the lower section and the middle section.

14. The transformer of claim 1, wherein a width of the upper section, a width of the middle section and a width of the lower section are smaller than a distance between two opposite edges of the first coil in a first direction, and the first direction faces toward the external portion.

15. The transformer of claim 1, wherein a width of the upper section, a width of the middle section and a width of the lower section are smaller than a distance between two opposite edges of the second coil in a first direction, and the first direction faces toward the external portion.

16. The transformer of claim 1, wherein a thickness of the middle section of the middle portion is smaller than a thickness of the upper section and a thickness of the lower section in a second direction, the second direction is vertical to a first direction, and the first direction faces toward the external portion.

17. The transformer of claim 1, wherein the first side pillar, the middle pillar, and the second side pillar extend outward from the body.

18. The transformer of claim 1, wherein the first gap is different from the second gap.

* * * * *